No. 614,712.  
J. T. FORREST.  
INK WELL.  
(Application filed Apr. 4, 1898.)
(No Model.)
Patented Nov. 22, 1898.
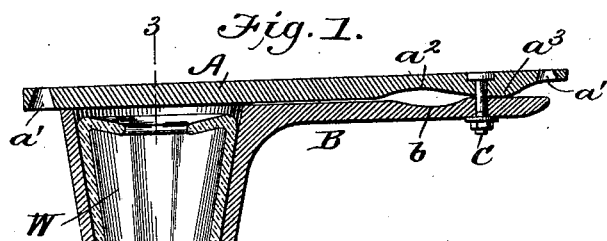
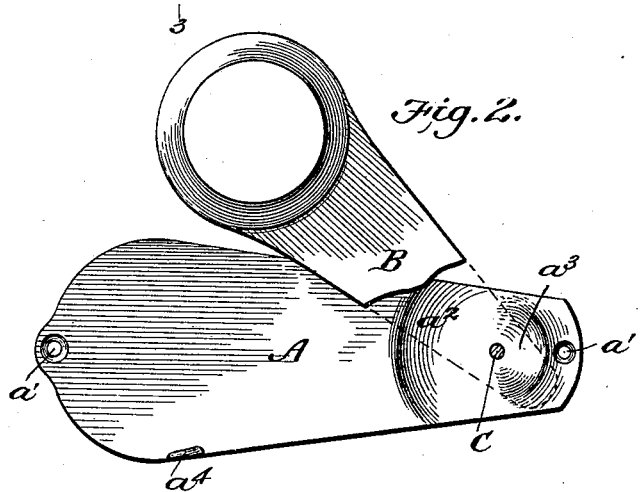
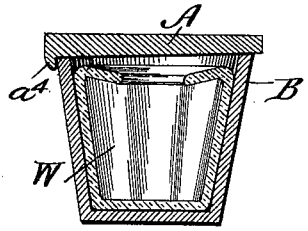
WITNESSES:
M. B. Blondel.
Edw. W. Byrn.
INVENTOR
J. T. Forrest.
BY Munn & Co.
ATTORNEYS.

UNITED STATES PATENT OFFICE.

JOHN T. FORREST, OF CHEHALIS, WASHINGTON.

INK-WELL.

SPECIFICATION forming part of Letters Patent No. 614,712, dated November 22, 1898.

Application filed April 4, 1898. Serial No. 676,419. (No model.)

*To all whom it may concern:*

Be it known that I, JOHN T. FORREST, of Chehalis, in the county of Lewis and State of Washington, have invented a new and useful Improvement in Ink-Wells, of which the following is a specification.

My invention relates to ink-wells of that form which are to be applied to desks by a rotary or pivotal action in a horizontal plane, so as to be swung under the overhanging edge of the desk to cover the ink-well or be turned out so as to expose the top of the ink-well when it is required for use or needs to be filled.

My invention consists in a special construction and arrangement of this general form of ink-well which is rendered more nearly air-tight and dust-proof and which is more easily and conveniently manipulated without danger of spilling and which is a complete entirety in itself and may be perfectly closed even when detached from the desk, as will be hereinafter more fully described.

Figure 1 is a longitudinal section of my improved ink-well. Fig. 2 is an inverted plan view with the ink-well opened. Fig. 3 is a transverse section through line 3 3 of Fig. 1; and Fig. 4 is a side view of a school-desk, showing the ink-well applied thereto.

In the drawings, A represents the upper plate, and B the lower plate, which forms the well-holder. The upper plate is provided with screw-holes $a'$ $a'$ at its ends, by which it may be attached to the under side of a projecting edge, shelf, or ledge of a desk, as shown in Fig. 4. This upper plate also forms a complete cover to the lower plate and well-holder contained therein. The lower plate is formed at one end with a pocket adapted to receive and tightly hold a glass ink-well W, whose upper edge is turned inwardly and downwardly, with a curling flange to prevent ink from slopping over from any sudden jerk in turning out the lower plate. The two plates A and B are at one end connected together pivotally by a rivet C. On the lower face of plate A there is a projection $a^3$ outside the rivet and an indentation $a^2$ inside the rivet, and on the upper face of the plate B there is a depression $b$ inside the rivet. The purpose of this is to provide a cam action that binds the plate B tightly against A when plate B is closed in longitudinal or parallel position under A and to allow a looseness and freedom of action when plate B is turned from under A. This causes the ink-well to be closed with an air-tight and dust-proof joint. In transverse section (see Fig. 3) the plates A and B are formed with reversely-inclined faces, which cause the plate B when turned under A to fit closely with a wedging action. A stop $a^4$, formed at one edge on the bottom of plate A, limits the inward movement of plate B.

The advantages of the ink-well are that it is dust-proof and air-tight, does not mar the looks of the desk, and can be filled with ink without getting any on the desk or books. When the pupil takes the pen from the ink, if any drops it falls on the floor and does not stain the desk, books, or papers. The chief feature of my invention, however, which distinguishes it from others of the pivotal class, is that it is a complete entirety and does not need the coöperation of the desk to close the ink-well, but the ink-well may be closed when the device is detached from the desk, and a very much tighter closure may be had at all times.

Having thus described my invention, what I claim as new, and desire to secure by Letters Patent, is—

1. An ink-well comprising two pivoted plates the one having screw-holes for attachment, and the other having an ink-well pocket, the two plates having a cam-joint at their pivoted ends substantially as and for the purpose described.

2. An ink-well, comprising two pivoted plates, the one having screw-holes for attachment, and the other having an ink-well pocket, the two plates having a cam-joint at their pivoted ends, and reversely-inclined adjacent faces at their free ends substantially as shown and described.

3. An ink-well consisting of the plate A having depression $a^2$ and elevation $a^3$, and also screw-holes $a'$ and stop-lug $a^4$; in combination with plate B pivoted to A at one end with a cam-joint, and having at the other a pocket for an ink-well substantially as and for the purpose described.

JOHN T. FORREST.

Witnesses:
U. E. HARMON,
C. W. HARRIS.